United States Patent
Watanabe

[19]

[11] Patent Number: 5,911,049
[45] Date of Patent: Jun. 8, 1999

[54] PCI CONNECTION SYSTEM FOR A PRINTER CONTROLLER BOARD

[75] Inventor: Atsushi Watanabe, Yokohama, Japan

[73] Assignee: Ricoh Company, Ltd., Tokyo, Japan

[21] Appl. No.: 08/679,565

[22] Filed: Jul. 15, 1996

[30] Foreign Application Priority Data

| Jul. 21, 1995 | [JP] | Japan | 7-186080 |
| Jul. 21, 1995 | [JP] | Japan | 7-186083 |
| Jul. 25, 1995 | [JP] | Japan | 7-189612 |

[51] Int. Cl.⁶ .................................................. G06F 13/00
[52] U.S. Cl. ........................ 395/280; 395/309; 395/281; 395/882
[58] Field of Search ..................................... 395/282, 281, 395/309, 306, 280, 882, 885, 891, 892

[56] References Cited

U.S. PATENT DOCUMENTS

| 5,440,755 | 8/1995 | Harwer et al. ............................ 395/800 |
| 5,559,968 | 9/1996 | Stancil et al. ............................ 395/306 |
| 5,642,489 | 6/1997 | Bland et al. ............................. 395/309 |
| 5,644,734 | 7/1997 | Hong ........................................ 395/309 |
| 5,664,124 | 9/1997 | Katz et al. ............................... 395/309 |

*Primary Examiner*—Ayaz R. Sheikh
*Assistant Examiner*—Ario Etienne
*Attorney, Agent, or Firm*—Oblon, Spivak, McClelland, Maier & Neustadt, P.C.

[57] ABSTRACT

A PCI connection system which may find particular application for connecting a printer controller board to a PC motherboard is described. The PCI connection system provides a PCI connector on a printer controller board to connect to a PCI connector of a PC motherboard. Further, the PC controller board may include a local bus which can be directly connected to a local bus of a further peripheral element controller board. Further, PCI conversion logic LSI circuitry can be removed from the printer controller board and can be placed on an extender board. This extender board can then also be utilized for connection to further peripheral element controller boards. A bypass can also be provided to directly connect a scanner to a printer through a scanner controller board and printer controller board formed as one unitary multifunctionalized controller board.

18 Claims, 14 Drawing Sheets

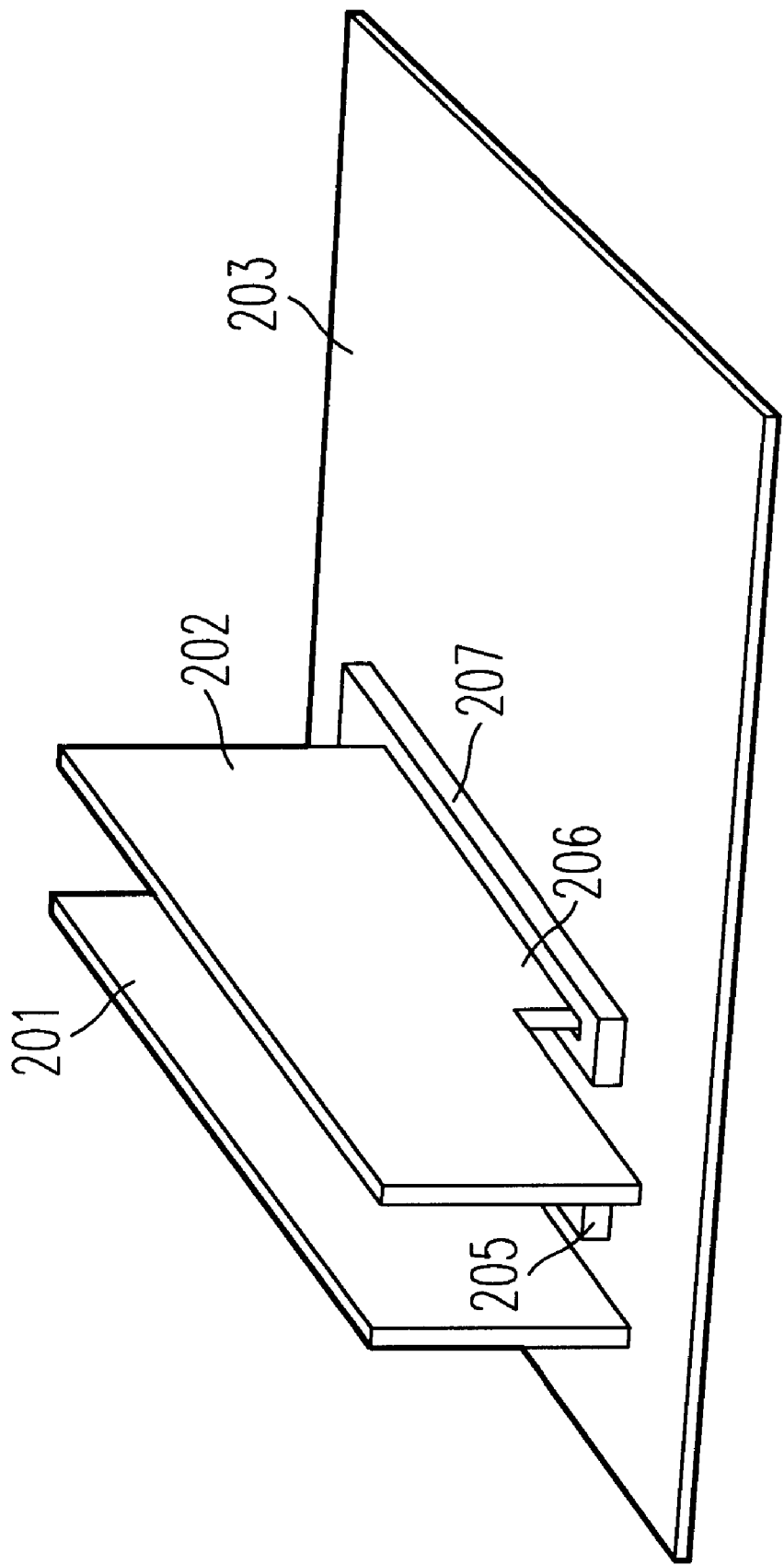

PCI CONNECTION SYSTEM FOR A PRINTER CONTROLLER BOARD

BACKGROUND OF THE INVENTION

Field of the Invention

The present invention is directed to a PCI connection system, which may find particular application for a printer controller board.

BACKGROUND OF THE INVENTION

Recently, the processing speed of a CPU has rapidly increased due to the development of microscopic processing technologies. However, the relatively lower processing speed of peripheral units using such a high speed CPU has caused a performance of system buses to be restricted. For this reason, PCI (Peripheral Component Interconnect) buses have been provided by, for example, SIG (Special Interest Group), including Intel Inc., as one type of high speed bus to solve such a performance problem. Various peripheral elements can then be connected to such a PCI bus.

FIG. 1 shows a background printer controller 25. As is shown in FIG. 1, such a background printer controller 25 includes an RS232C connector 2, a centro connector 4, a hard disk drive (HDD) connector 6, an option interface (I/F) connector 8 and SIMM memory elements 10. Each of these elements is connected to a local bus 12, which may include RISC buses. Also connected to local bus 12 is a system control ASIC element 16, a DRAM 18, smoothing logic 20, a code ROM 22 and a font ROM 24. Connected to the smoothing logic 20 is a printer engine I/F 26 which drives a printer. A CPU 14 controls the overall operation of such a printer controller 25. Further, (although not illustrated) the printer controller 25 may include interfaces, such as NIC to connect to a LAN, telephone lines, and further extended memories.

Such a printer controller 25 as shown in FIG. 1 of the present specification is typically designed as one board and is designed to communicate with a PC motherboard so that print information from the PC motherboard can be sent to the printer controller 25 of FIG. 1, which can thereby control a printer through the printer engine I/F 26.

FIG. 2 shows such a background PC motherboard 203 which can communicate with printer controller 25. Such a background PC motherboard 203 includes an RS232C connector 1, a centro connector 3, a floppy disk drive (FDD) connector 5, a HDD connector 203f, a keyboard connector 9, and several ISA I/F connectors 11. Each of these elements is connected to an ISA bus 21. A PCI bus 203a is also provided which is connected to several PCI I/F connectors 19. Also connected between the PCI bus 203a and the ISA bus 21 is an I/O PCI bridge 13. A system PCI host bridge 203C is also connected to the PCI bus 23, and is also connected to a local bus 27. A plurality of SIMM memory elements 29 are also connected to the local bus 27. A CPU 203d for controlling this PC motherboard 203 is also provided and is connected to the local bus 27.

In these background devices as shown in FIG. 1 and FIG. 2, the printer controller 25 is connected to the PC motherboard 203 by the RS232C connectors 1 and 2. That is, in such background devices, the RS232C connectors 1, 2 are utilized to transmit data between the PC motherboard 203 and the printer controller 25. Transmitting data via the RS232C connectors 1, 2 suffers from the drawback of being a low speed data transmission, which thereby results in low processing times in such devices.

SUMMARY OF THE INVENTION

Accordingly, one objective of the present invention is to provide a novel printer controller board which can allow a high speed transmission of data with a PC motherboard.

This objective of the present invention is achieved by the present invention connecting a printer controller board to a PC motherboard through a PCI interface.

A further objective of the present invention is to allow a printer controller board such as in the present invention to easily communicate with other peripheral elements, and particularly by bypassing communications through a PC motherboard.

This further objective of the present invention is achieved by allowing a novel direct connection between local buses of a printer controller board and a further peripheral element.

A further objective of the present invention is to provide a novel printer controller board which can have a simplified structure and a reduced cost.

This further objective of the present invention is achieved in the present invention by removing PCI bridge circuitry from a printer controller board and providing such PCI bridge circuitry on a specialized extender controller board. The specialized extender controller board can further allow connection to other peripheral element controller boards, which can thereby also achieve the benefits of removing expensive PCI bridge circuitry therefrom.

A further objective of the present invention is to even further simplify communication between two peripheral elements, for example between a scanner and a printer, to allow high speed transmission between such elements.

This further objective of the present invention is achieved by providing novel bypass circuitry in a scanner controller board and a printer controller board so that data can be provided from a scanner to a printer through such bypass circuitry, to thereby avoid needing to transmit data on the local buses of the scanner controller board and printer controller board.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIG. 7 further explains the embodiment of FIG. 6;

DESCRIPTION OF THE PREFERRED EMBODIMENTS

Figure 3:
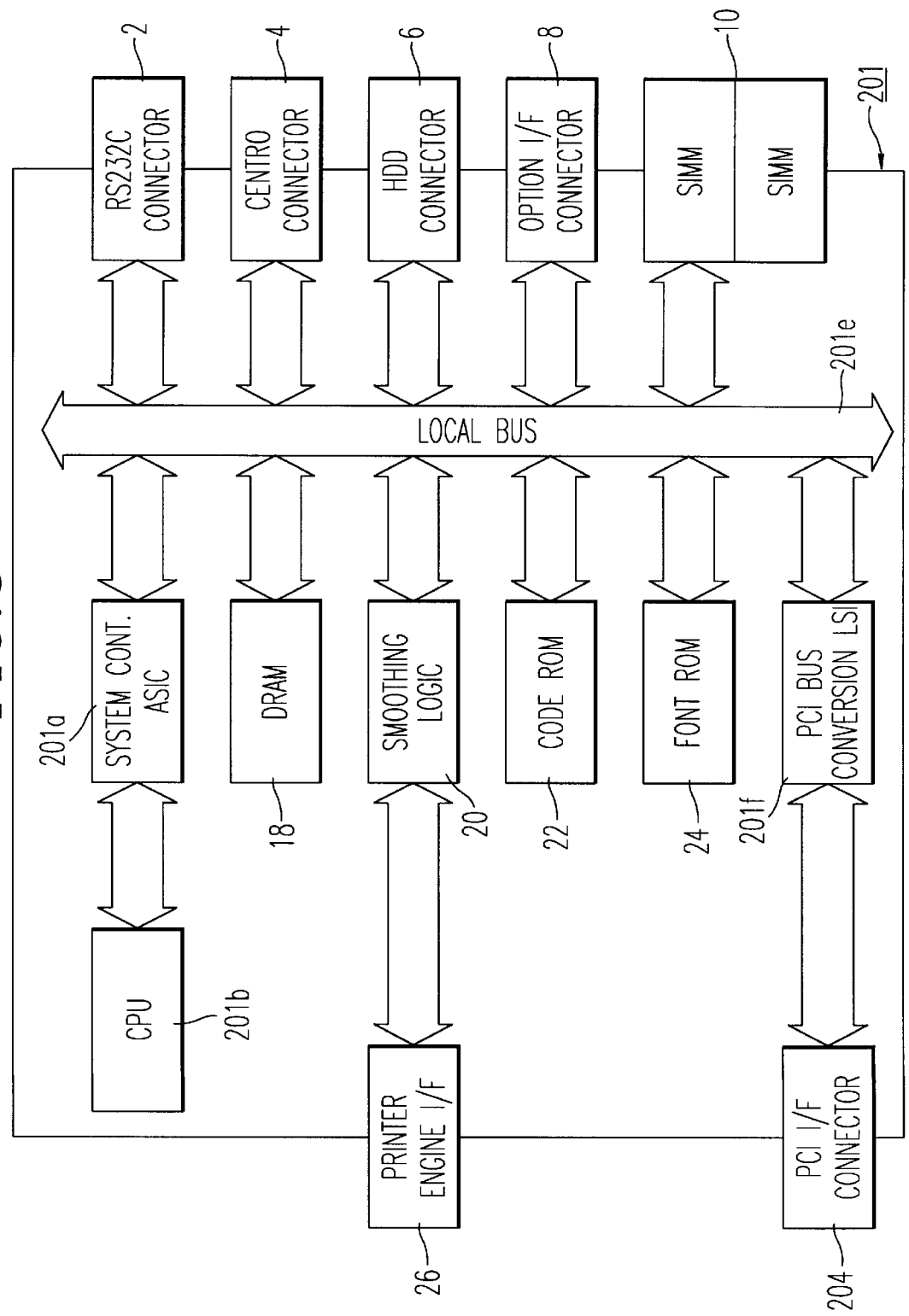
FIG. 3 shows a printer controller board according to one embodiment of the present invention.

Referring now to the drawings, wherein like reference numerals designate identical or corresponding parts throughout the several views, and more particularly to FIG. 3 thereof, a novel printer controller board 201 of the present invention is detailed.

Figure 1:
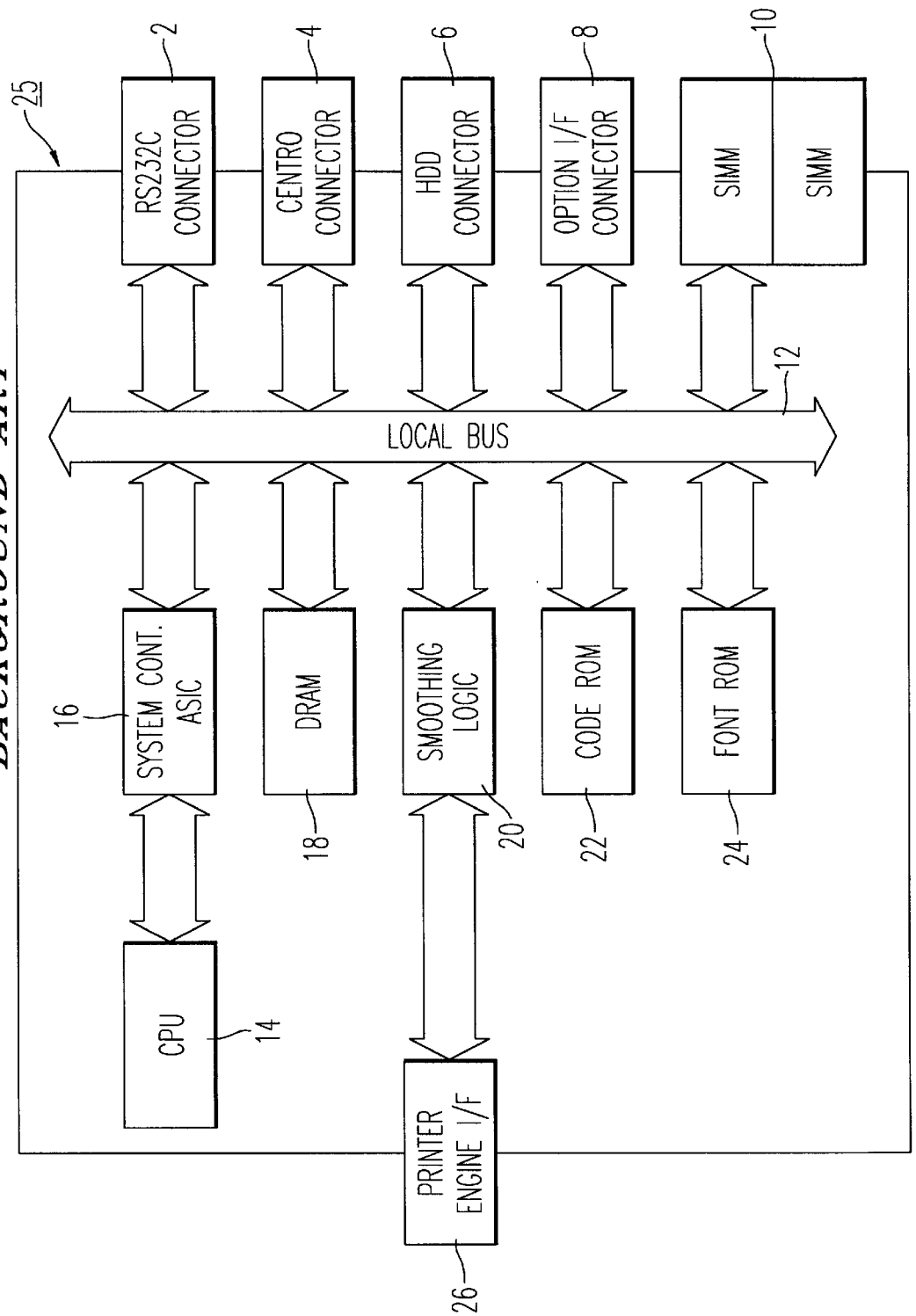
FIG. 1 shows a printer controller board according to a background embodiment.

FIG. 3 shows a printer controller board 201 according to one embodiment of the present invention. Such a printer controller board 201 of the present invention is similar to the background printer controller board 25 shown in FIG. 1, however, that the printer controller board 201 of the present invention includes a PCI bus conversion LSI circuit 201f connected to the local bus 201e. Also, connected to this PCI bus conversion LSI circuit 201f is a PCI I/F connector 204.

Figure 2:
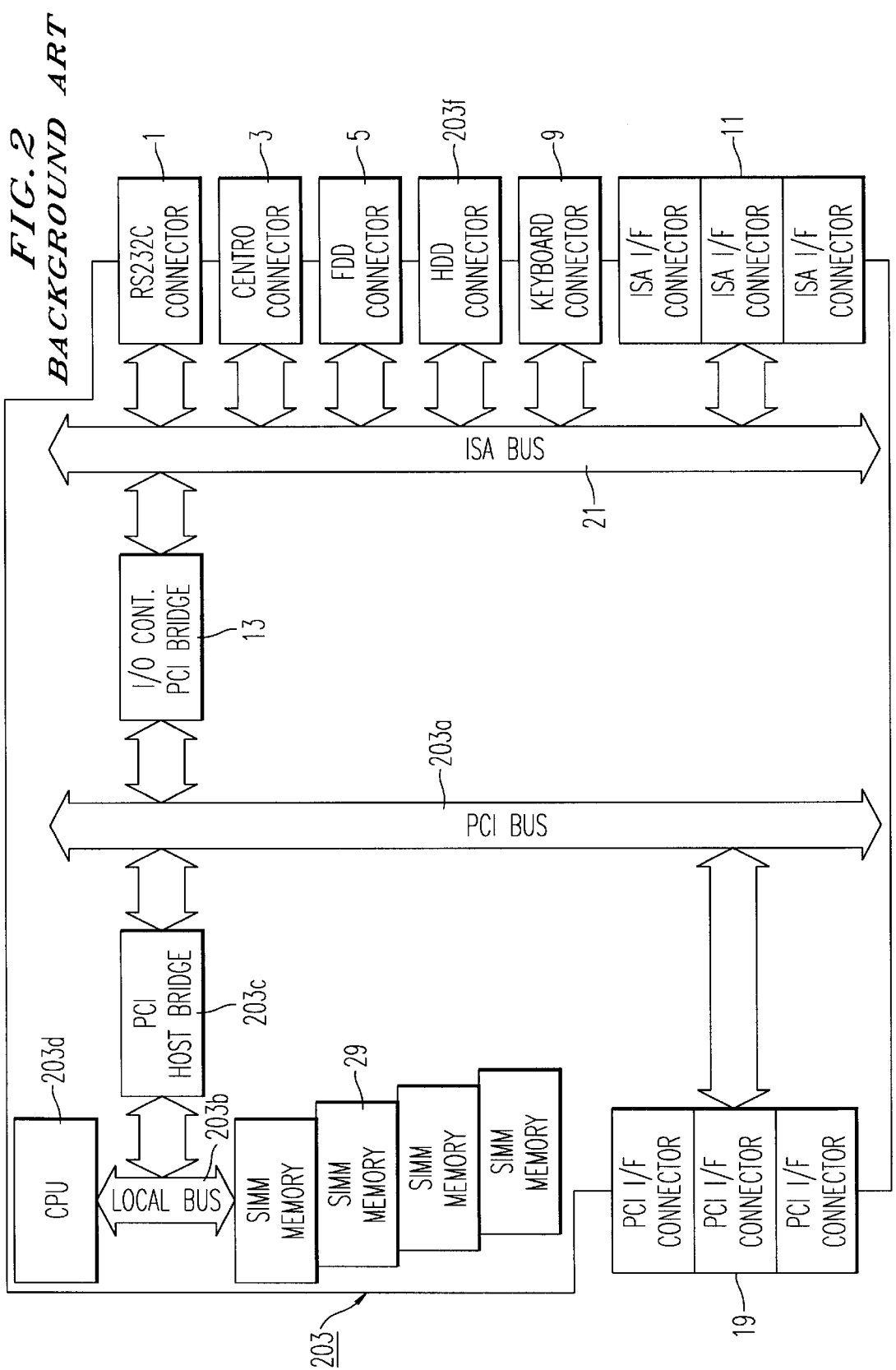
FIG. 2 shows a PC motherboard according to a background embodiment.

The use of such a PCI bus conversion LSI 201f and the PCI I/F connector 204 allows the printer controller board 201 of the present invention to be connected to the PCI I/F connectors 19 of the background PC motherboard 203 shown in FIG. 2 of the present specification.

That is, one of the benefits of this embodiment of the present invention is that a PCI I/F connector 204, which is a known element, is integrated into a printer controller board 201 in the present invention. In this way, the printer controller board 201 of the present invention can be directly connected to a PCI I/F connector 205 of the PC motherboard 203 of FIG. 2 of the present specification. The PCI bus conversion LSI circuitry 33 is known in other contexts, but heretofore has not been implemented in such a printer controller board 201 such as in the present invention.

Figure 4A:
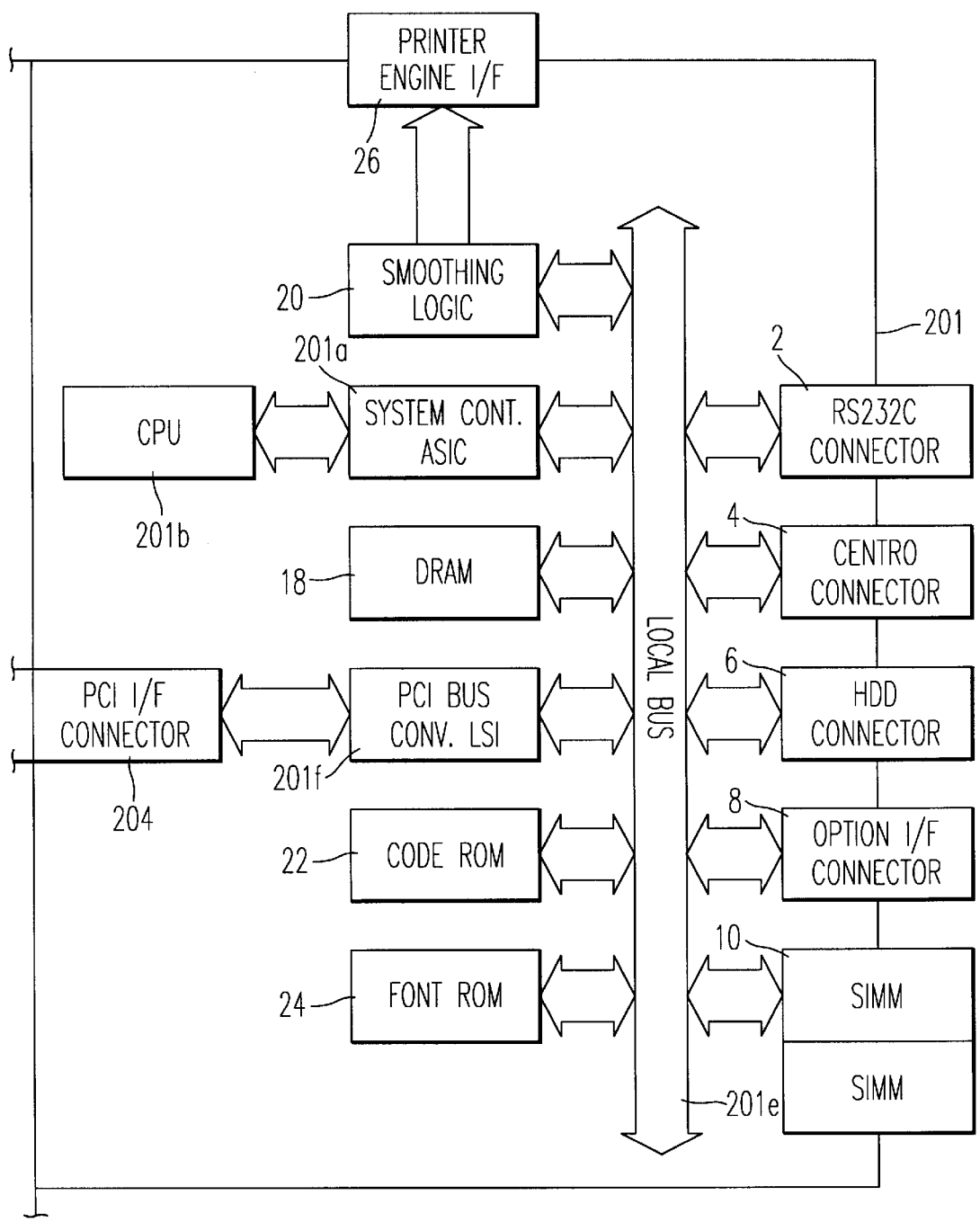
FIG. 4 shows the printer controller board according to one embodiment of the present invention connected to a PC motherboard.
Figure 4B:
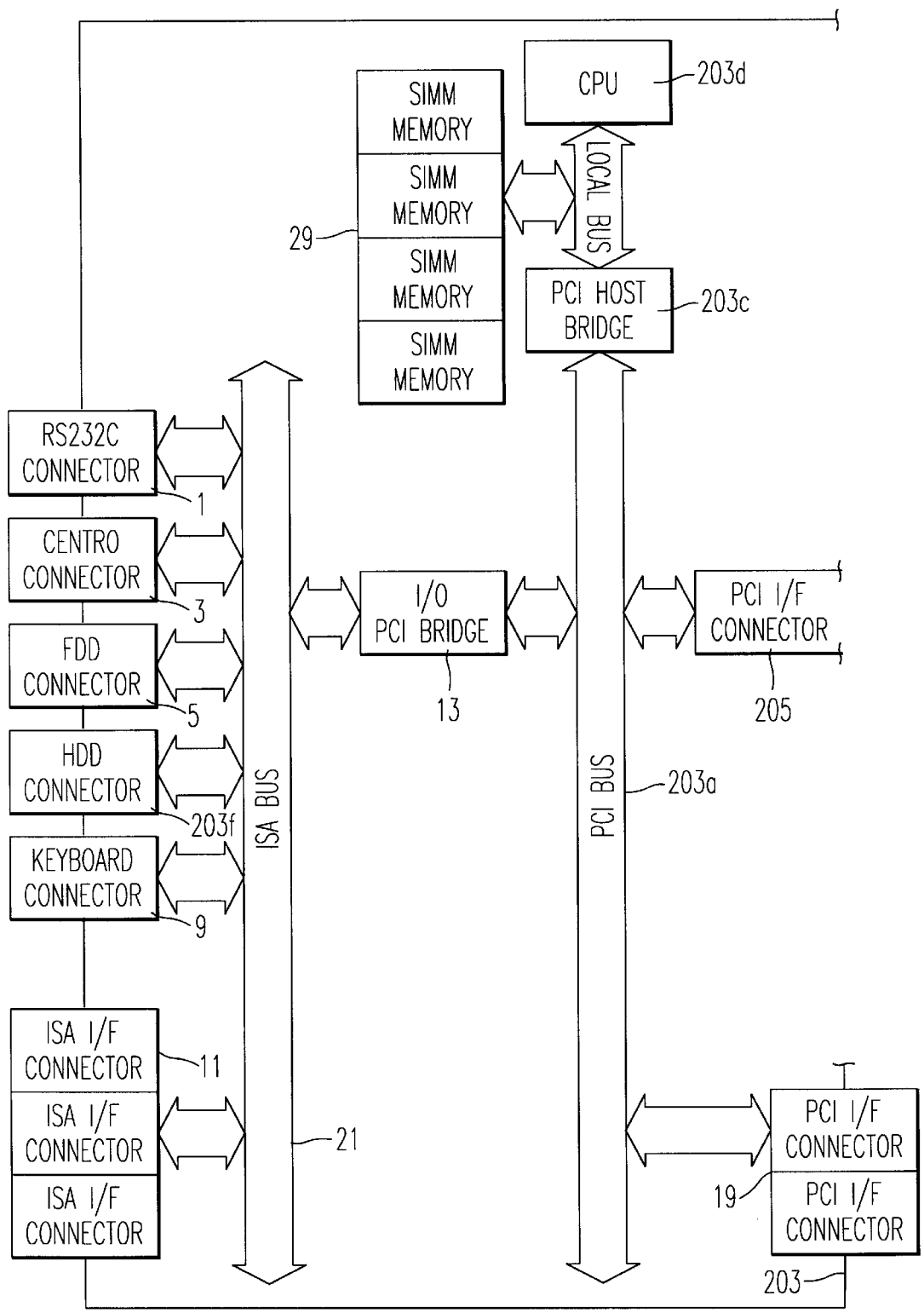

This connection is also shown in FIG. 4 of the present specification which details a connection between the printer controller board 201 of the present invention and the PC motherboard 203.

By virtue of printer controller board 201 as shown in FIG. 3 of the present invention, such a printer controller board 201 can communicate at a high speed with the PC motherboard 203 via the PCI bus 203a of the PC motherboard 203, which thereby allows the operational efficiency of such a printer controller board 201 to be significantly enhanced.

The device as shown in FIG. 4 of the present specification may be implemented as one unitary multifunctionalized apparatus. That is, such a device as shown in FIG. 4 of the present specification represents a multifunctionalized printing apparatus which includes both a printer controller board 201 and a PC motherboard section 203, and which provides the benefit of reducing space for installation as well as providing high speed connection to a CPU 203 of the PC motherboard 203. Such a multifunctionalized printing apparatus may include printer functions, a scanner function, a copy machine function and a facsimile function, and the like, by combining the printer controller board 201 having printer functions, and also a further scanner module having scanner functions (as discussed in greater detail below), to the PC motherboard 203 which has the PC functions.

Figure 5:
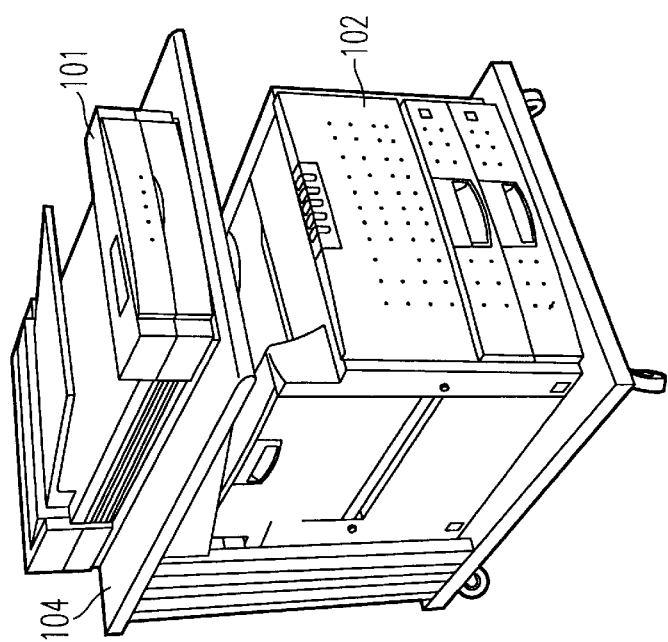
FIG. 5 shows an overall view of one embodiment of the present invention.

Such a combined multifunctionalized printing apparatus is shown in one embodiment in FIG. 5.

FIG. 5 is a perspective view of a multifunctionalized printing apparatus 102 according to one embodiment of the present invention. In the printing apparatus 102 according to this embodiment, in addition to having printer functions, as illustrated, image data read by a scanner 101 can be output by the printing apparatus 102 by combining with the scanner 101. In other words, the composition of the printing apparatus 102 and the scanner 101 results in realizing copy machine functions in structure. Further, table 104 is a stand on which the printing apparatus 102 and the scanner 101 are placed.

Figure 6:
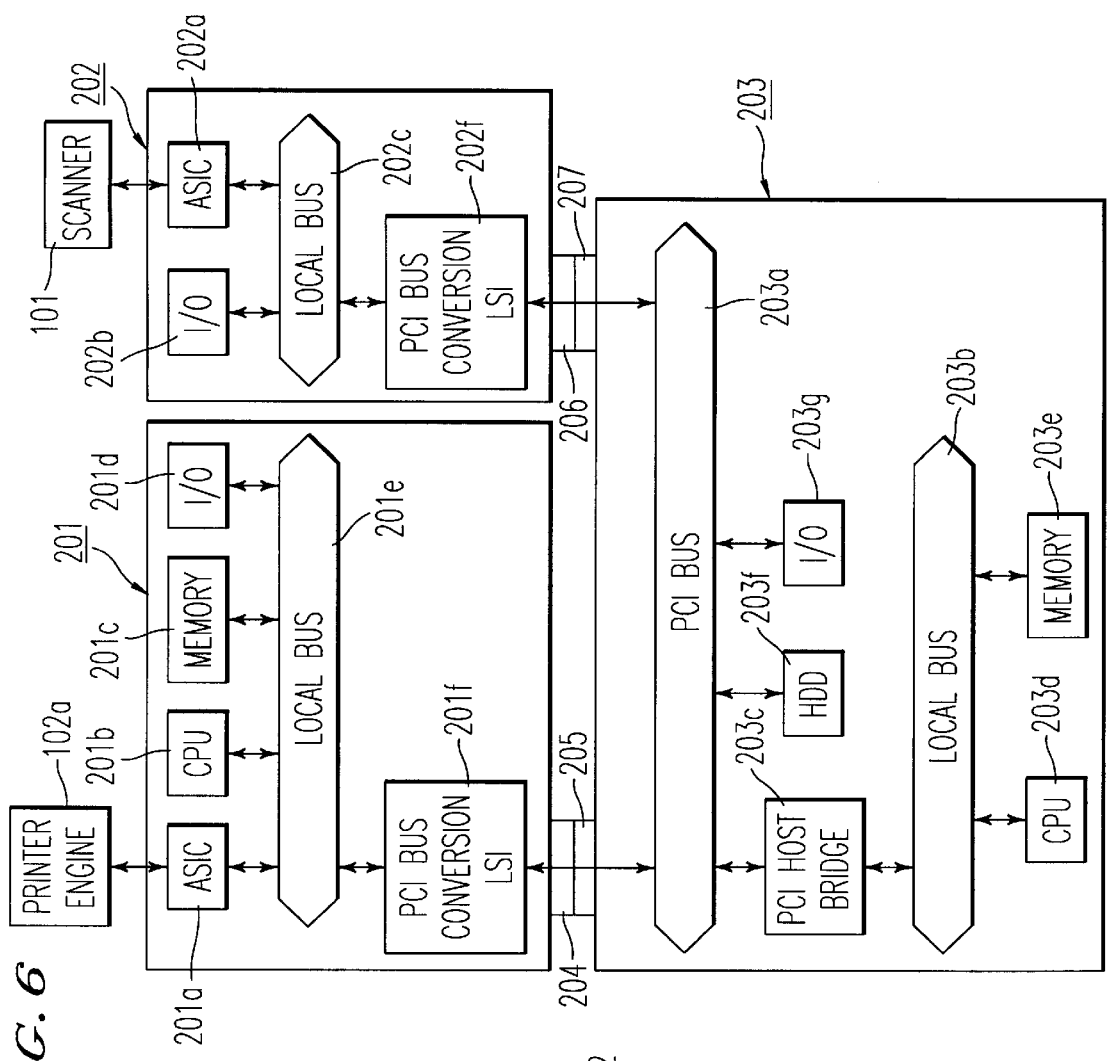
FIG. 6 shows a further embodiment of the present invention.

FIG. 6 shows a further embodiment of the present invention which shows a multifunctionalized apparatus which includes both a printer controller board 201 and a scanner control board 202 connected to a PC motherboard 203 by PCI connectors 204–207.

The printer controller board 201 shown in FIG. 6 of the present specification is the same as printer controller board 201 shown in FIG. 3 of the present specification, but is shown in a simplified format in FIG. 6. In FIG. 6 the various memories are shown as 201c and the various input/output circuits are shown as 201d. Further, the PC motherboard 203 shown in FIG. 6 of the present specification is the same as that shown in FIG. 2 of the present specification, although again in a simplified format.

In this way, FIG. 6 is a schematic view showing a PCI system using a PCI bus applied to a printing apparatus as a further embodiment of the present invention. As shown in FIG. 6, such a PCI system includes a printer controller board 201 as a printer module realizing printer functions by controlling a printer engine 102a, a scanner controller board 202 as a scanner module realizing scanner functions by controlling a scanner 101, and a PC motherboard 203 to realize copy functions, facsimile functions, and the like, by controlling the printer controller board 201 and the scanner controller board 202.

In the PC motherboard 203, CPU 203d and memory 203e are connected to a host bus (internal local bus) 203b. Further, devices with voluminous data (e.g. hard disk drives), or other devices requiring transmitting data at a high speed (for example a high speed I/O such as a video device, and the like) are connected to general purpose PCI bus 203a. Also, the PC motherboard 203 can be entirely controlled by CPU 203d by connecting the PCI bus 203a to the host local bus 203b through PCI host bridge circuit (bus bridge circuit) 203c.

Further, the printer controller board 201 and the scanner controller board 202, which may be extender boards, see also FIG. 7, each include a PCI bus conversion LSI, respectively 201f and 202f, including a PCI bridge circuit (bus bridge circuit) loaded thereon respectively. Internal local buses 201e, 202c of the respective extender boards 201 and 202 are connected to the PCI bus 203a of the PC motherboard 203 through the respective PCI bus conversion LSI circuits 201f and 202c by connecting the PCI connector 204, 206 of each extender board 201, 202 to the respective PCI connector 205, 207 on the side of PC motherboard 203.

FIG. 7 shows an embodiment of the installation of extender boards 201, 202 in the printing apparatus of FIG. 6. Concretely, the insertion of the PCI connectors 204, 206 of the printer controller board 201 and the scanner controller board 202, which may be extender boards, respectively into the two PCI connectors 205, 207 on the side of the PCI motherboard 203 enable extension of the system. In this way, according to this embodiment of the present invention, the extender boards 201, 202 linked to the PC motherboard 203 are connected to each other through the PCI bus 203a on the PC motherboard 203.

Accordingly, in this embodiment of the present invention, when transmitting and/or receiving data between extender boards 201, 202 only, for example when transmitting data from the scanner controller board 202 to the printer controller board 201, the data must still be processed through the PC motherboard 203, even though data transmission on the PC motherboard 203 is unnecessary. As a result, in such a data transfer operation, after the data is conversion-processed through a PCI bus conversion LSI on one extender board, the data is then transferred to the PC motherboard 203, and is then again conversion-processed through the PCI bus conversion LSI on the other extender board. This long data transfer operation results in a significant loss of time in data transmission and in the overall data conversion processing.

Figure 8:
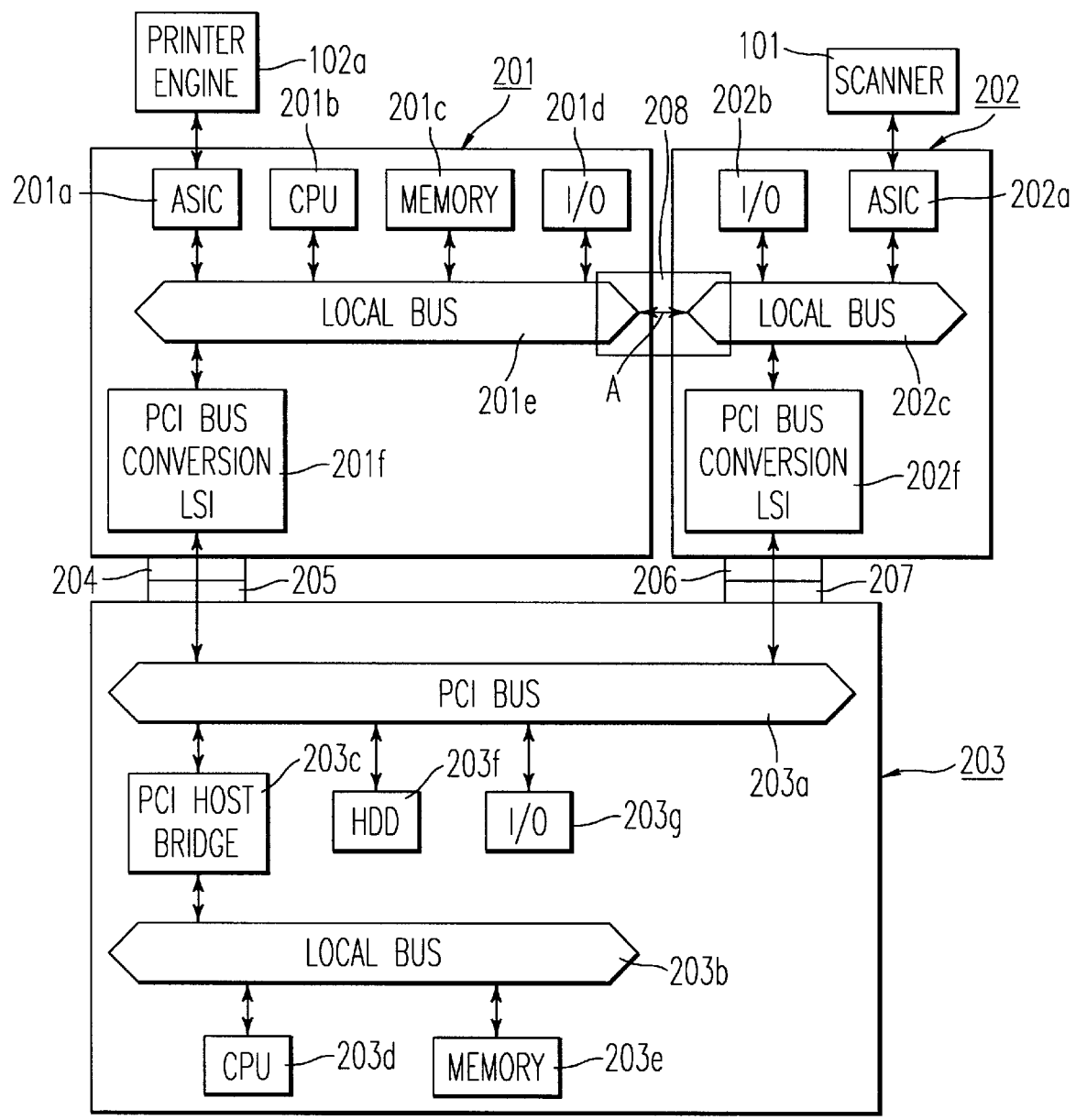
FIG. 8 shows a further embodiment of the present invention.
Figure 9A:
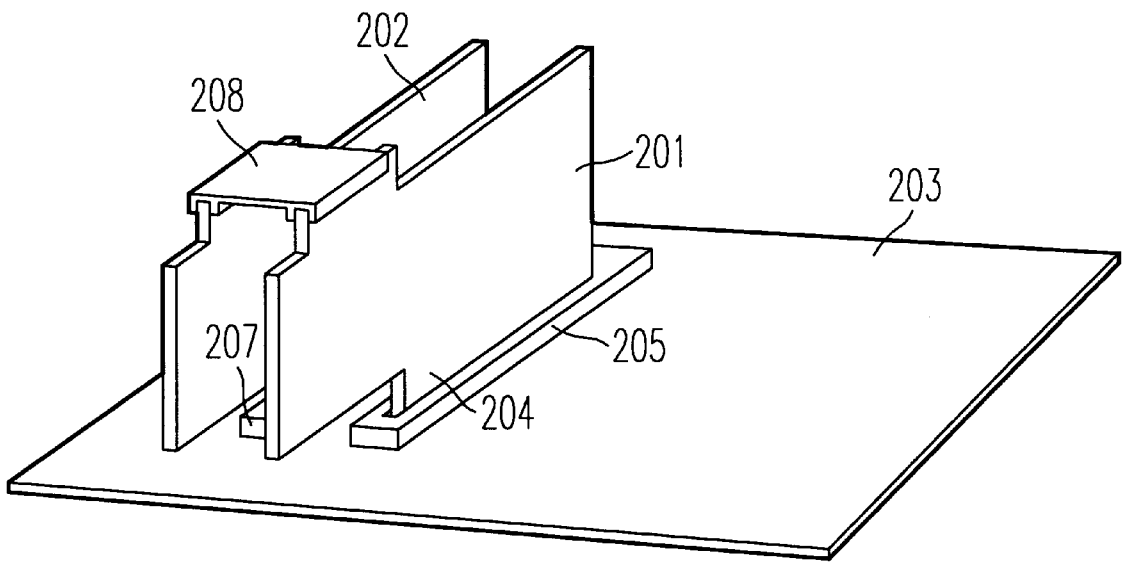
FIGS. 9(a) and 9(b) further explain the embodiment of FIG. 8.

To overcome such problems, the present invention provides a further embodiment as shown in FIGS. 8 and 9. As shown in FIG. 8, in this embodiment the PCI connector 204 of the printer controller board 201 and the PCI connector 206 of the scanner controller board 202 are inserted into the PCI connectors 205 and 207 of PC motherboard 203, and the printer controller board 201 and the scanner controller board 202 are thereby connected to the PC motherboard 203.

Figure 9B:
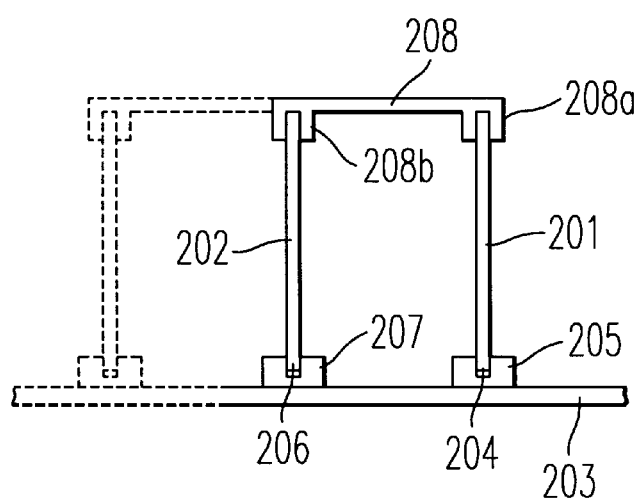

This further embodiment of the present invention provides a further structure in which the internal local buses 201e and 202c of the printer controller board 201 and the scanner controller board 202 are connected together and integrated through a connector 208. The connector 208 connects the internal local buses 201e and 202c and has, as shown in FIG. 9(b), two connector sections 208a and 208b which can be connected to the internal local buses of the extender boards (in this case, the printer controller board 201 and the scanner controller board 202). As shown in FIG. 8, a bypass A is formed to integrate the internal local buses 201e and 202c by maintaining and sandwiching parts of the internal local buses 201e and 202c between the connector sections 208a and 208b.

In the above structure, the printer controller board 201 and the scanner controller board 202 are connected to each other through the bypass A with the connector 208 for connecting the internal local buses 201e and 202c independently of the PCI bus 203a of the PC motherboard 203. Consequently, data from the scanner 101 can be directly transmitted to the printer controller board 201 through the bypass A, i.e. without having to pass through the PCI bus 203a of the PC motherboard 203.

According to this embodiment of the present invention as mentioned above, by virtue of the bypass A formed with the connector 208 for connecting internal local buses 201e and 202c, independent of the general purpose PCI bus 203a, the internal local buses 201e, 202c are connected to each other, so that data, e.g. video data, can be directly transferred from the scanner controller board 202 to the printer controller board 201 through the bypass A, as needed. This avoids data conversion by the PCI bus conversion LSI of both the printer controller board 201 and scanner controller board 202. As a result, data conversion processing can be more efficient.

Also, according to this embodiment of the present invention, the bypass A is formed by connecting through the connector 208 for connecting the internal local buses 201e and 202c, and without using a harness, which has, therefore, an advantage in not deteriorating any electric characteristics. Moreover, the structure as shown in FIG. 9 also has a further advantage in that the extender boards 201, 202 are installed more securely.

Further, the bypass A is formed by only sandwiching a part of the internal local buses between the connector sections 208a and 208b of the connector 208 for connecting the internal local buses 201e, 202c without installing connectors separately on the side of the extender boards 201, 202, which simplifies the installation. Also, as shown in FIG. 9(b) by the dotted lines, the internal local buses of further extender boards can be integrated (or connected each other) consecutively.

In each of the embodiments shown in FIGS. 6–9, PCI bus conversion LSI circuitry is installed in each of the extender boards 201, 202 themselves, and the internal local bus 201e, 202c of each extender board 201, 202 is connected to the PCI bus 203a of the PC motherboard 203. As a result, a problem arises in the high cost of the extender boards due to the high cost of providing the PCI bus conversion LSI circuitry in each extender board, as well as in the high cost of the apparatus installing the PCI system together with the number of extender boards.

Figure 10:
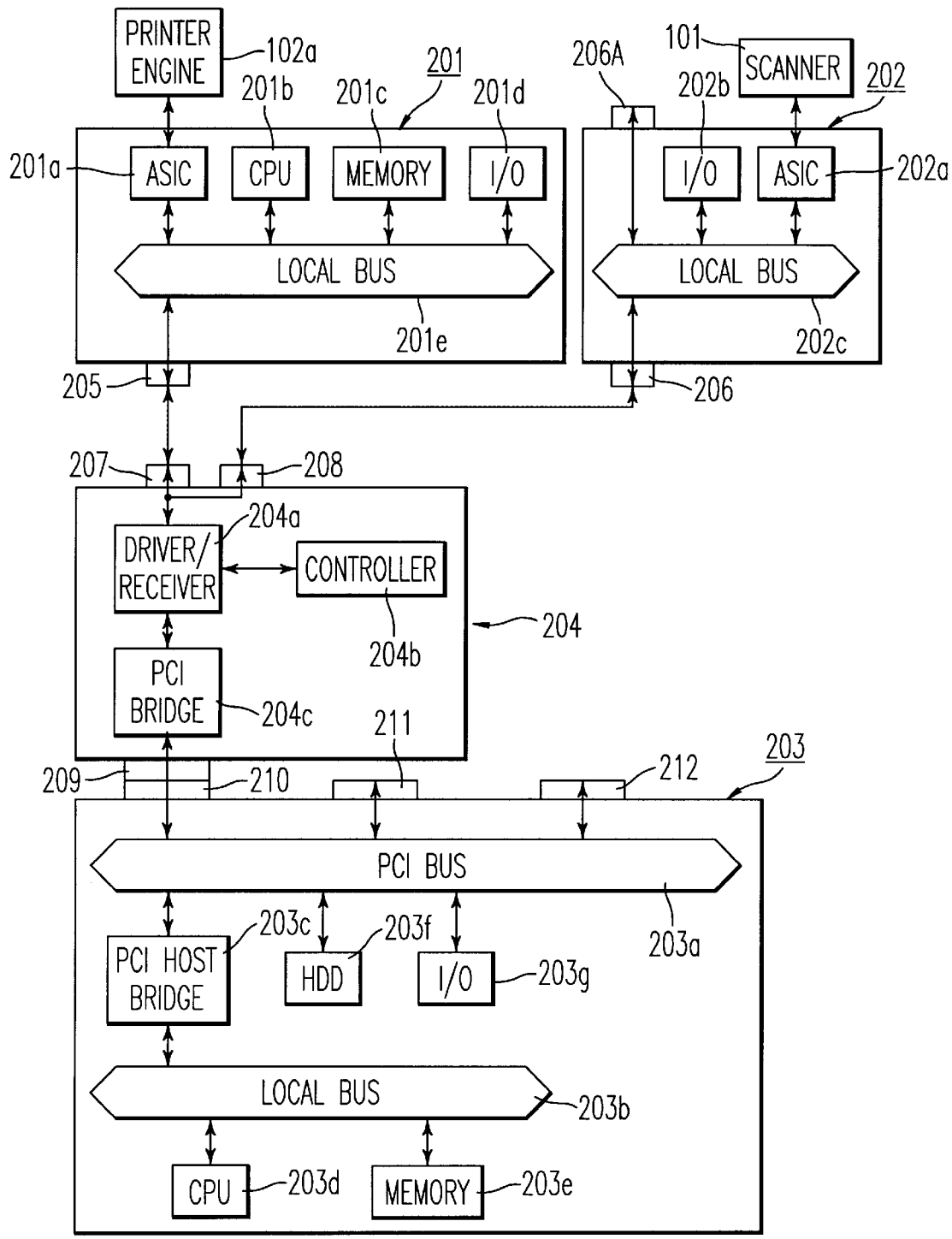
FIG. 10 shows a further embodiment of the present invention.
Figure 11:
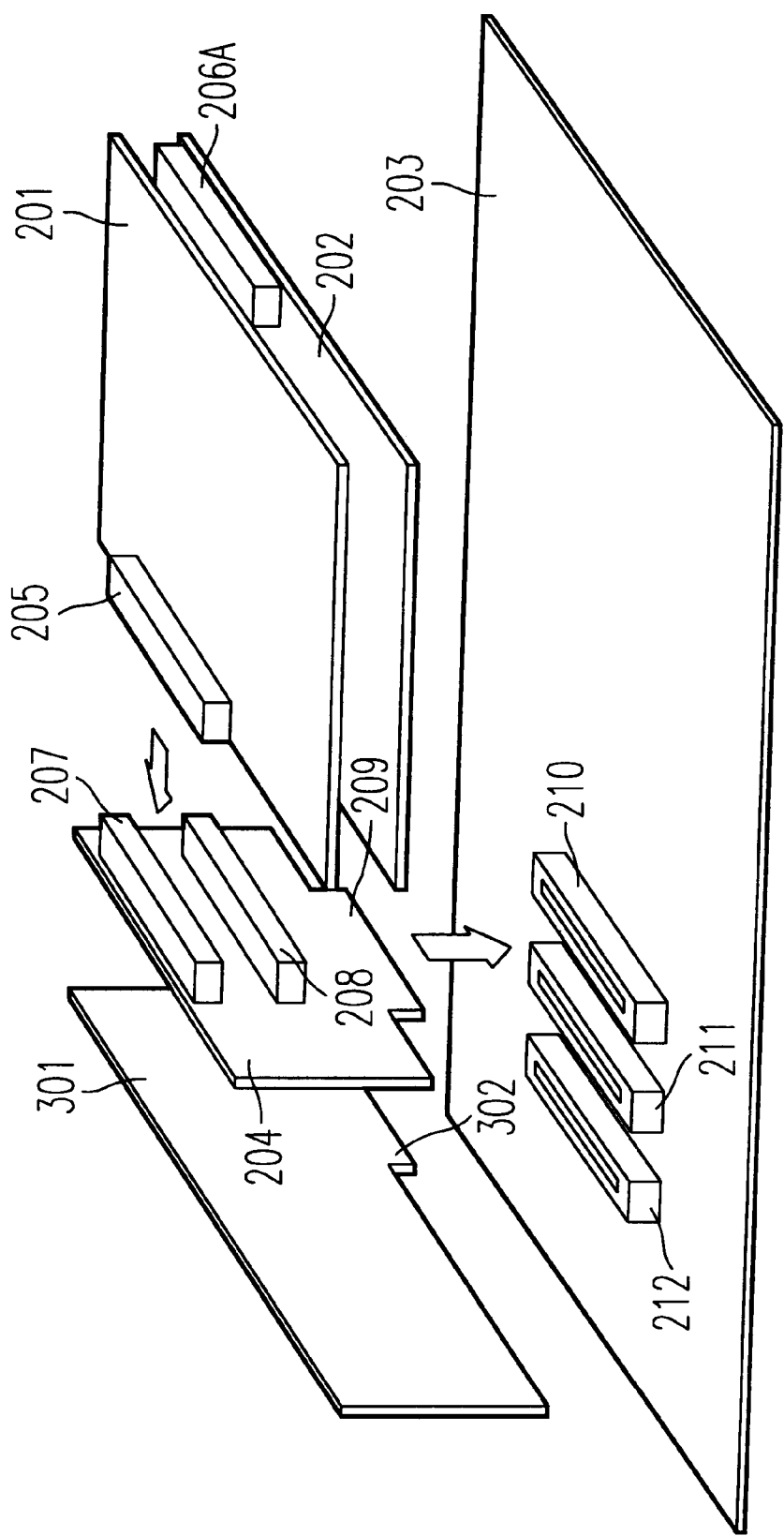
FIG. 11 further explains the embodiment of FIG. 10.
Figure 12:
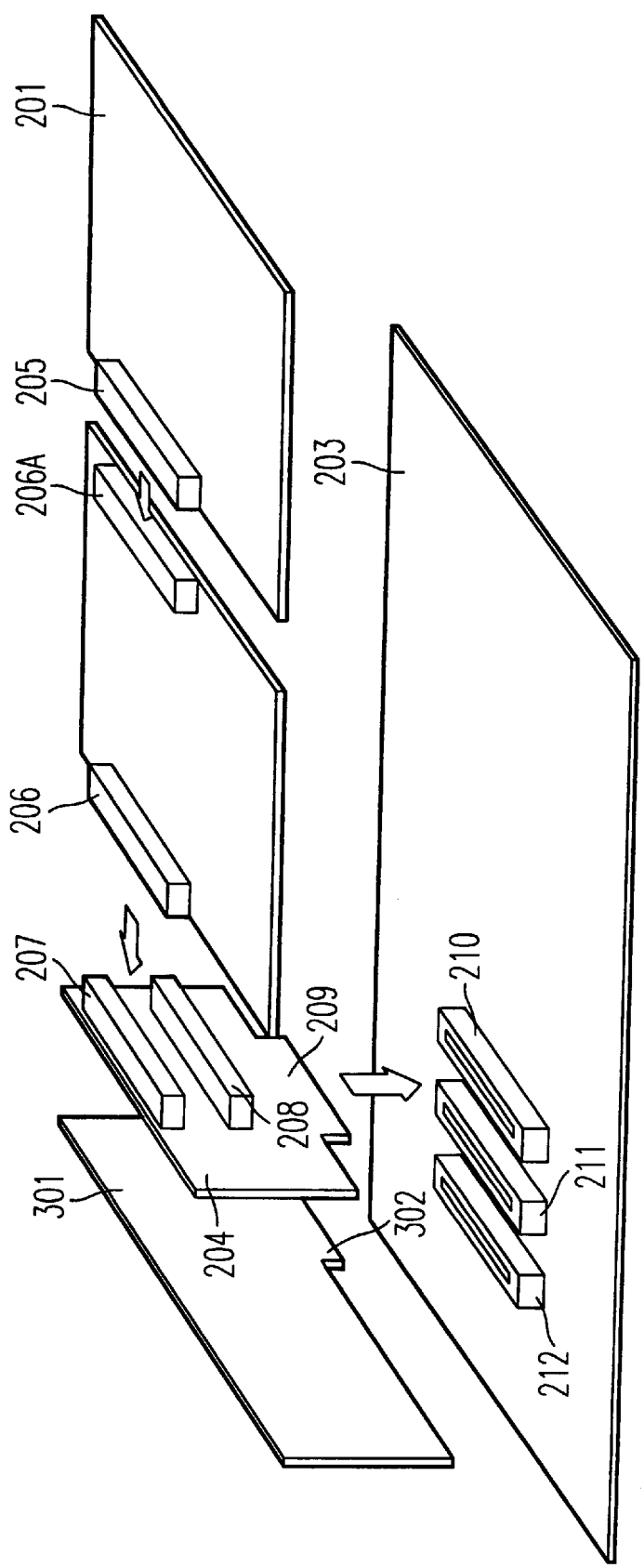
FIG. 12 shows a further modification of the embodiment of FIG. 10.

To overcome such potential problems, the present invention sets forth a further embodiment as shown in FIGS. 10–12. As shown in FIG. 10, in such a further embodiment of the present invention an extender controller board 204 is provided which includes PCI connectors 207, 208, which may then be connected respectively to PCI connectors 205 and 206 of the printer controller board 201 and the scanner controller board 202.

That is, this further embodiment of the present invention includes extender board 204 connecting to the PCI bus 203a of the PC motherboard 203 through PCI connectors 209, 210. This extender board 204 includes connector (No. 1 connector) 209 for the PCI interface which can be connected into the PCI bus slots 210 to 212 installed in the PC motherboard 203, two connectors (No. 2 connectors) 207 and 208 for an internal local bus interface which can be connected to the connectors 205 and 206 of the printer controller board 201 and scanner controller board 202, a driver/receiver 204a to transmit and to receive data through the connectors 207 and 208, controller 204b to control the driver/receiver 204a, and PCI bridge 204c for connecting to the PCI bus 203a of PC motherboard 203 through connectors 209, 210. The driver/receiver 204a, controller 204b and PCI bridge 204c correspond to conventional PCI bus conversion LSI circuitry.

Such an embodiment for installation using the extender board 204 for connecting to the PCI bus is further shown in FIGS. 11 and 12.

As shown in FIG. 11, the connector 209 of the extender board 204 is inserted into the PCI bus slot 210 of the PC motherboard 203. The extender board 204 for connecting to the PCI bus 203a of PC motherboard 203 is then connected to the PC motherboard 203. Next, the connector 205 of the printer controller board 201 is inserted into the connector 207 of the extender board 204, and then the printer controller board 201 is connected to the extender board 204, to thereby connect to the PCI bus 203a of the PC motherboard 203.

Thereby, as illustrated in FIG. 10, the internal local bus 201e of the printer controller board 201 is connected to the PCI bus 203a of the PC motherboard 203 through the connector 205, connector 207, driver/receiver 204a, PCI bridge 204c, connector 209, and PCI bus slot 210.

Similarly, the insertion of the connector 206 of the scanner controller board 202 into the connector 208 of extender board 204, and the connection of the scanner controller board 202 to the extender board 204, causes the internal local bus 202c of the scanner controller board 202 to connect to the PCI bus 203a of the PC motherboard 203 through the extender board 204.

Also, the insertion of the connector 209 of extender board 204 directly into the PCI bus slot 212 enables the extender board 204 to connect to the PC motherboard 203. In this case, the PCI bus conversion LSI is, of course, loaded on the extender board 204.

As another embodiment of using the extender board 204, as shown in FIG. 12, after the connector 209 of the extender board 204 is inserted into the PCI bus slot 210 of the PC motherboard 203, and the extender board 204 is connected to the PC motherboard 203, the connector 206 of the scanner controller board 202 is inserted into the connector 207 of the extender board 204, and the scanner controller board 202 is then connected to the extender board 204. Then, the connector 205 of the printer controller board 201 may be connected to the connector 206A of the scanner controller board 202.

In this case, the internal local bus 202c of the scanner controller board 202 is connected to the PCI bus 203a of the PC motherboard 203 through the extender board 204. Further, this results in the internal local bus 201e of the printer controller board 201 being connected to the internal local bus 202c of the scanner controller board 202 through the connector 205 and the connector 206A. As a further result, the internal local bus 201e of the printer controller board 201 is connected to the PCI bus 203a through a similar path as that for the internal local bus 202c of the scanner controller board 202.

In other words, the internal local bus 201e of printer controller board 201 and the internal local bus 202c of scanner controller board 202 can be connected together and are connected to the PCI bus 203a in this further embodiment.

According to this embodiment as mentioned above, through the extender board 204 on which the PCI bus conversion LSI is loaded, extender boards (printer controller board 201, scanner controller board 202, and the like) can be connected to PC motherboard 203, so it is not needed to arrange the PCI bus conversion LSI on each controller board, which enables reducing the cost of each controller board. Also, the cost of the overall apparatus is reduced as well.

Further, according to this embodiment, the PC motherboard 203 is shown as containing three PCI bus slots 210 to 212 installed therein, but is not limited to this number of slots. Similarly, the number of connectors (207 and 208) of the extender board 204 is not limited to two.

In the embodiment of the present invention as shown in FIGS. 10–12, the connector 206A is shown as being provided on the scanner controller board 202. However, such a further connector 206A could also be provided on the printer controller board 201. With this further structure, the printer controller board 201 would be inserted into the extender board 204, and then the PCI connector 206 of the scanner controller board 202 would be inserted into the further PCI connector 206A which has been provided on the printer controller board 201.

In the embodiments discussed above, there may be a problem of raising the cost of the apparatus having printing functions by combining printer modules having printing functions and scanner modules having scanner functions through the PC motherboard having the PC functions, as discussed above.

As a result of development in multi-functioning, miniaturization, and networking (constitution of a LAN), a digital copying machines as discussed above is equipped with a plurality of functions such as a facsimile function, an offline printer function, a network function, and the like, in addition to a copying function.

In a digital copying machine such as in the present invention which provides a scanner for reading a manuscript image and outputting an image signal, an image processing part applies various kinds of image processing to the image signal input from the scanner, and a printer forms an image on recording paper based on the image signal from the image processing part. The image signal read by the scanner 101 is temporarily accumulated in a memory via a bus in the image processing part, and is subjected to a necessary image processing and output to the printer, where an image is formed on record paper.

Furthermore, in a digital copying machine with multiple functions, a font ROM 24 for realizing a printer function, or an interface device (such as NIC) for realizing a network function or a facsimile function is provided.

However, since the digital copying machine is structured so that all the image data input is temporarily memorized in a memory via the bus, subjected to a predetermined image processing based on any of a designated copying function, facsimile function, printer function, and networking function, and is then output to recording paper via the printer, there may be a problem that other functions cannot be performed simultaneously when the copying function is performed because the load of a CPU is large and the bus is dedicated to transfer of the image data.

Specifically, when a copying function is demanded in the midst of a network output, the copying function can not be performed until the network processing is finished, or otherwise the copying function is performed first and then the network output is resumed by connecting again the network after the copying function is finished. Thus, problems may arise such that the copying function cannot be performed as needed, and the working efficiency is lowered because retransfer on the network takes time. A further embodiment of the present invention overcomes such drawbacks as now discussed with reference to FIGS. 13 and 14.

Figure 13:
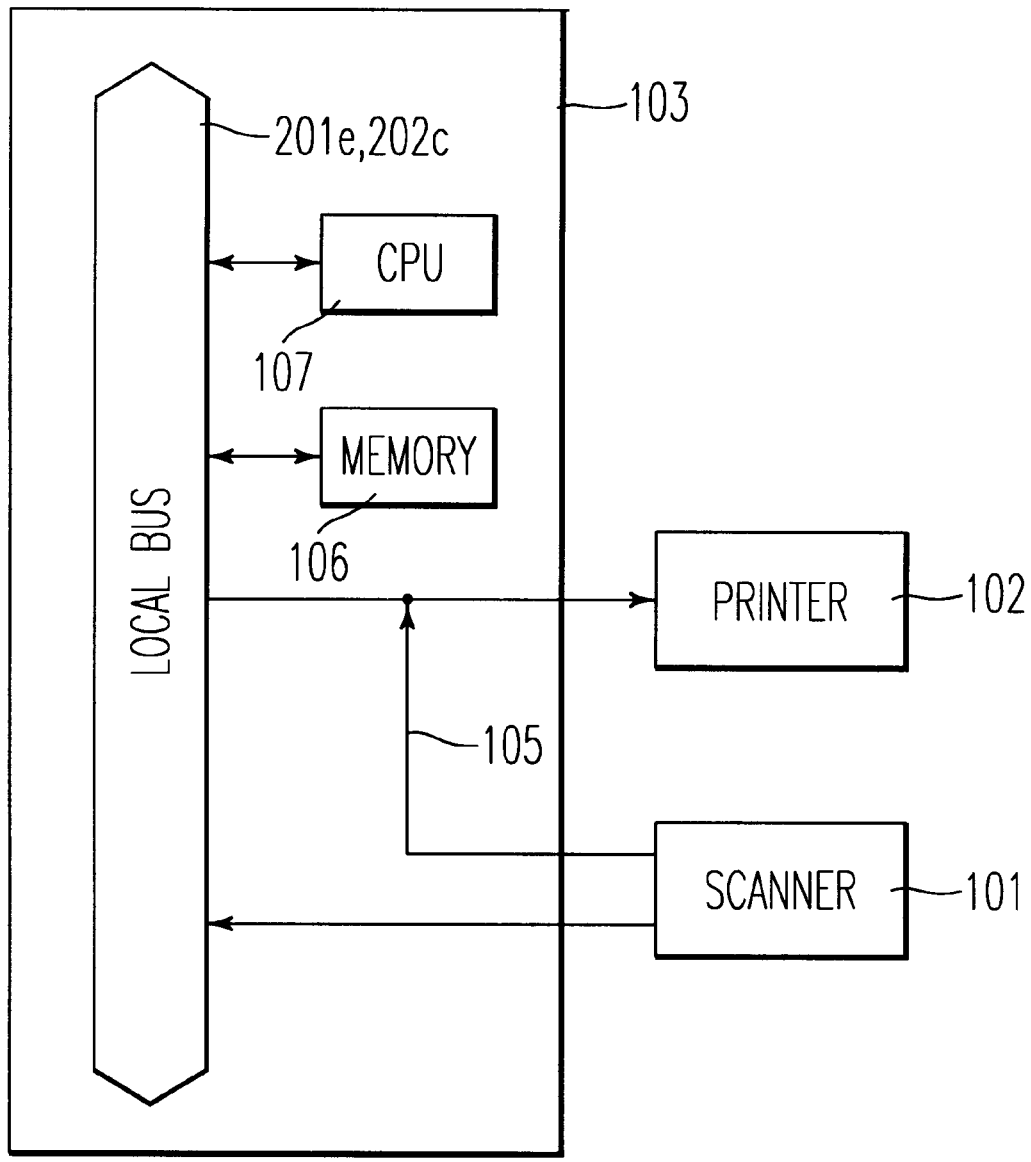
FIG. 13 shows a further embodiment of the present invention.

FIG. 13 is a block structural view showing an outline of the digital copying machine of FIG. 5. The digital copying machine provides scanner 101 for optically reading a manuscript image and outputting an image signal, image processing part 103 for applying various kinds of image processing to the image signal output from the scanner 101, printer 102 for forming an image on record paper based on the output signal from the image processing part 103, and further a bypass route 105 for outputting the image signal input from the scanner 101 directly to the printer 102 without passing the image signal through a bus 201e, 202c in the image processing part 103. Additionally, 106 is a memory of the image processing part 103, and 107 is a CPU of the image processing part 103. This image processing part is essentially a combination of printer controller board 201 and scanner controller board 202 connected together to form one multifunctionalized circuit board.

The embodiment of the present invention shown in FIG. 8 of the present specification provides a direct connection between a printer controller board 201 and a scanner controller board 202. This further embodiment of the present invention as shown in FIG. 13 provides a different system for transmitting data directly from the scanner 101 to the printer 102. This further embodiment of the present invention provides a further benefit of even avoiding transferring data along the local buses 201e and 202c of the respective printer controller board 201 and scanner controller board 202 as shown in FIG. 8.

In such a structure of the embodiment of the present invention as shown in FIG. 13, a first function is provided for outputting the image signal input from the scanner 101 by the image processing part 103 to the printer 102 after temporarily accumulating the image signal in the memory 106 via the bus 201e, 202c, and applying a necessary image processing to the image signal. A second function is also provided for outputting the image signal input from the scanner 101 to the printer 102 via the bypass route 105 in synchronization with a printer engine 102a of the printer 102 using control signals such as a line synchronization signal, a frame synchronization signal and a transfer synchronization signal output by the scanner 101.

Therefore, the image signal transferred from the scanner 101 to the printer 102 can take either of two routes: route A which passes through the buses 201e, 202c by a first function and route B which passes through the bypass route 105 by a second function.

In other words, when the image signal is transferred from the scanner 101 to the printer 102 via route B which passes through the bypass route 105 by the second function to perform a copying function, the bus 201e, 202c is open. Consequently, the bus 201e, 202c can be used for other functions, and thus other functions can be simultaneously performed with the copying function.

Figure 14:
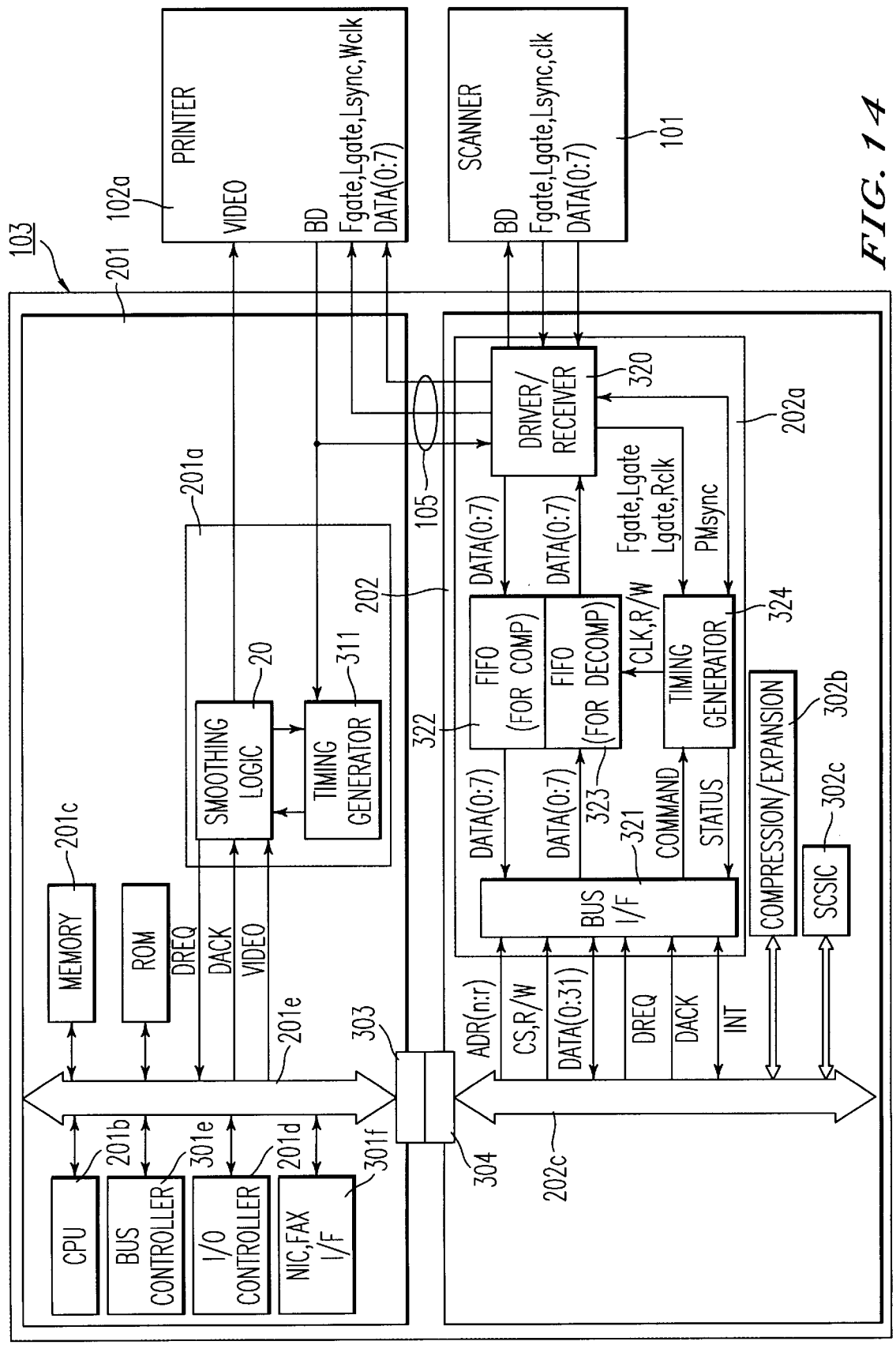
FIG. 14 further explains the embodiment of FIG. 13.

FIG. 14 shows a structure of the image processing part 103 of the digital copying machine in this embodiment of the present invention. As noted above, this structure of the present invention is essentially a combination of printer control board 201 and scanner control board 202 discussed in the prior embodiments. FIG. 14 further explains such subject matter and further details specific elements of such a printer control board 201 and scanner control board 202. A combination of such a printer controller board 201 and scanner controller board 202 is labelled as an image processing part 103.

The image processing part 103 includes printer controller board 201 as a control substrate for controlling a printer engine 102a and a scanner controller board 202 as a control substrate for controlling the scanner 101 from the side of the printer 102. In other words, the digital copying machine is controlled by the printer controller board 201 and the scanner controller board 202, and at the same time, image processing is performed using these printer controller board 201 and scanner controller board 202.

In FIG. 14, reference numerals 303 and 304 denote connectors for connecting the printer controller board 201 and the scanner controller board 202 respectively. These connectors 303, 304 provide the same function as the connector 208 shown in FIG. 8. A bus 201e of the printer controller board 201 is connected to a bus 202c of the scanner controller board 202 through connectors 303, 304.

In addition, and as shown in FIG. 14, the printer controller board 201 provides ASIC 201a for exchanging data with the printer engine 102a, CPU 201b for controlling the printer control board 201 and the scanner control board 202, a memory 201c, an I/O controller 201d, a bus controller 301e, bus 201e which may include a RISC bus, and an NIC for connecting with LAN and a telephone circuit, and an I/F (interface) 301f.

The scanner controller board 202 provides ASIC 202a for exchanging data with the scanner 101, a compression/extension part 302b for compressing/extending image data, a SCSI controller 302c and a bus 202c which may include a RISC bus.

Further, a structure for realizing the first function and the second function of the present invention will now be concretely explained by referring to FIG. 14. The ASIC 201a includes a smoothing logic 20 for applying smoothing to the image data (e.g. video data) transferred via the bus 201e and outputting the image data to the printer engine 102a, and a timing generator 311 for generating a control signal (Psync signal and Lsync signal) for inputting a BD signal (a beam disc signal for the main scanning of the printer engine 102a) from the printer engine 102a and controlling the output timing of the image data output from the smoothing logic 20 to the printer engine 102a.

In addition, the ASIC 202a of the scanner controller board 302 includes a driver/receiver 320 for sending and receiving data (a BD signal, an Fgate signal, an Lgate signal, a clk signal and Data (0:7)) between the scanner 101 and the printer engine 102a, a bus I/F 321 for exchanging data with the bus 202c, a FIFO 322 for outputting data received from the driver/receiver 320 to the bus I/F 321, a FIFO 323 for outputting data input from the bus I/F to the driver/receiver 320, and a timing generator 324 for outputting a control signal (a CLK signal and a PMsync signal) for controlling the operation timing of the FIFO 322 and the FIFO 323.

Further, as shown in FIG. 14, a bypass route 105 is provided from the scanner 101 to the printer engine 102a via the ASIC 202a (driver/receiver 320) and the ASIC 201a. This bypass route 105 has a signal line for transferring a BD signal output from the printer engine 102a to the scanner 101, a signal line for transferring an Fgate signal, an Lgate signal, an Lsync signal and a clk signal output from the scanner 101 to the printer 102, and a signal line for transferring Data (0:7) output from the scanner 101 to the printer 102.

Each signal used in the present embodiment is defined as follows.

The Fgate signal (Frame Gate signal) refers to a frame synchronization signal output by the scanner 101 and denotes an efficient scope of an image signal in an auxiliary scanning direction. The Fgate signal changes along with the designated read line number or the automatically detected manuscript length. The Fgate signal changes in synchronization with rise of the Lsync signal. The Lsync signal (Line Sync signal) refers to a line synchronization signal output by the scanner 101 and designates an efficient scope of the image signal in the main scanning direction. The Lsync signal changes in synchronization with the rise of the clk signal.

The Lgate signal (Line Gate signal) refers to a line synchronization signal output by the scanner. The Lgate signal designates an efficient scope of the image signal in a main scanning direction. The Lgate signal changes along with the designated read dot number or the automatically detected manuscript length. The Lgate signal changes in synchronization with the rise of the clk signal.

The clk signal refers to a transfer synchronization signal of VIDEO data (Data 0 through Data 7) output by the scanner 101. The scanner 101 changes the VIDEO data with the rise of this clock signal clk. When receiving the VIDEO data, the VIDEO data may be latched with the fall of this clock signal clk.

Data 0 through Data 7 (VIDEO data) refer to VIDEO data output by the scanner 101. Here, the data is a binary value data serial type. In the case of the binary data, HIGH is given to white and LOW is given to black. In addition, in the case of a multiple value data, the whole bit HIGH is the darkest and the whole bit LOW is the brightest (but the two can be reversed with a command).

The BD signal (beam disc signal) is a beam disc signal for the main scanning of the printer engine 102a. The VIDEO signal refers to a laser diode light signal for writing of the printer engine 102a output from the printer controller board 201.

The operation of the digital copying machine will now be further explained with the aforementioned structure. Normally, when a copying function is singly performed, the printer 102 and the scanner 101 are controlled by the printer controller board 201 and the scanner controller board 202. Data (0:7) read by the scanner 101 is output to recording paper by the printer 102.

In this case, Data (0:7) read by the scanner 101 is temporarily accumulated in the memory 201c via route A (the driver/receiver 302, the FIFO 322, the bus I/F 321 and the bus 202c, 201e) and is subjected to predetermined image processing. Further, the image is subjected to smoothing by the smoothing logic 20 of the ASIC 201a and is output to the printer engine 102a as a VIDEO signal.

On the other hand, when the copying function is not singly performed, or in other words when any other function, such as a networking function, is performed together with the copying function, the route B which passes through the bypass route 105 by the second function is selected, so that the Data (0:7) read by the scanner 101 is output to the printer engine 102a via the route B (the driver/receiver 320 and the bypass route 105). In this case, the driver/receiver 320 and the timing generator 324 take a synchronization timing using the BD, Fgate, Lgate, Lsync and clk signals and transfer Data (0:7) to the printer engine 102a.

Since Data (0:7) is transferred via the bypass route 105, other parts of the printer controller board 201 excluding the ASIC 201a can be freely operated. Consequently, a networking function can be simultaneously performed, and thereby data can be input from the I/F 301f for NIC and FAX and can be accumulated in the memory 201c via the bus 201e.

When the copying function is demanded during a network output, the image data input via the network is accumulated in the memory 201c after outputting up to a clear end of data being output by the printer 102 (an image data input via the network), such as the output of a page. On the other hand, by performing the second function, Data (0:7) is transferred from the scanner 101 to the printer 102 via the bypass route 105, so that the copying function can be performed. Consequently, as the copying function can be performed continuously without interrupting the networking function, it is not necessary to take time for retransferring data through the network.

As described above, in accordance with this further feature of the present embodiment, other functions can be simultaneously performed together with a copying function, so that workability and work efficiency can be improved.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A printer controller board to be connected to a computer motherboard which includes a first PCI connector connected to a PCI bus, the printer controller board comprising:

a local bus;

a second PCI connector to be connected to the first PCI connector of the computer motherboard; and a PCI bus connection LSI circuit for converting input signals on the second PCI connector to a format for the local bus and for converting signals from the local bus to a format to be transmitted to the PCI bus of the computer motherboard through the first and second PCI connectors.

2. A printer controller board to be connected to a computer motherboard which includes a first PCI connector connected to a PCI bus, the printer controller board comprising:

a local bus;

a second PCI connector to be connected to the first PCI connector of the computer motherboard;

a PCI bus connection LSI circuit for converting input signals on the second PCI connector to a format for the local bus and for converting signals from the local bus to a format to be transmitted to the PCI bus of the computer motherboard through the first and second PCI connectors; and a bypass circuit connected to the local bus for connecting directly to a local bus of a peripheral element controller board.

3. A printer controller board to be connected to a computer motherboard which includes a first PCI connector connected to a PCI bus, the printer controller board comprising:

a local bus;

a second PCI connector to be connected to the first PCI connector of the computer motherboard;

a PCI bus connection LSI circuit for converting input signals on the second PCI connector to a format for the local bus and for converting signals from the local bus to a format to be transmitted to the PCI bus of the computer motherboard through the first and second PCI connectors; and bypass circuitry to connect a printer connected to the printer controller board to a scanner.

4. A printer controller board means to be connected to a computer motherboard means which includes first PCI connector means for connecting to PCI bus means, comprising:

local bus means;

second PCI connector means for connecting to the first PCI connector means of the computer motherboard means; and PCI bus connection LSI means for converting input signals on the second PCI connector means to a format for the local bus means and for converting signals from the local bus means to a format to be transmitted to the PCI bus means of the computer motherboard means through the first and second PCI connector means.

5. A printer controller board means to be connected to a computer motherboard means which includes first PCI connector means for connecting to PCI bus means, comprising:

local bus means;

second PCI connector means for connecting to the first PCI connector means of the computer motherboard means;

PCI bus connection LSI means for converting input signals on the second PCI connector means to a format for the local bus means and for converting signals from the local bus means to a format to be transmitted to the PCI bus means of the computer motherboard means through the first and second PCI connector means; and a bypass means connected to the local bus means for connecting directly to a local bus means of a peripheral element controller board means.

6. A printer controller board means to be connected to a computer motherboard means which includes first PCI connector means for connecting to PCI bus means, comprising:

local bus means;

second PCI connector means for connecting to the first PCI connector means of the computer motherboard means;

PCI bus connection LSI means for converting input signals on the second PCI connector means to a format for the local bus means and for converting signals from the local bus means to a format to be transmitted to the PCI bus means of the computer motherboard means through the first and second PCI connector means; and bypass circuitry means to connect a printer means connected to the printer controller board means to a scanner means.

7. A printer control system to be connected to a computer motherboard which includes a first PCI connector connected to a PCI bus, comprising:

an extender board comprising:
a second PCI connector to be connected to the first PCI connector of the computer motherboard;
a PCI bridge circuitry connected to the second PCI connector; and
a plurality of third PCI connectors connected to the PCI bridge circuitry;
a printer controller board comprising:
a fourth PCI connector; and
a first local bus connected to the fourth PCI connector.

8. The printer control system according to claim 7, wherein the fourth PCI connector of the printer controller board is connected to a first of the plurality of third PCI connectors of the extender board, and further comprising a peripheral element controller board comprising a second local bus and a fifth PCI connector to be connected to a second of the plurality of third PCI connectors of the extender board.

9. The printer control system according to claim 7, further comprising a peripheral element controller board comprising:
a fifth PCI connector to be connected to a first of the plurality of third PCI connectors of the extender board;
a second local bus; and
a sixth PCI connector connected to the second local bus;
wherein the fourth PCI connector of the printer controller board is connected to the sixth PCI connector of the peripheral element controller board.

10. The printer control system according to claim 8, wherein the peripheral element controller board is a scanner controller board.

11. The printer control system according to claim 9, wherein the peripheral element controller board is a scanner controller board.

12. The printer control system according to claim 7, further comprising bypass circuitry to directly connect a printer connected to the printer controller board to a scanner.

13. A printer control system to be connected to a computer motherboard means which includes a first PCI connector means connected to a PCI bus means, comprising:

an extender board means comprising:
second PCI connector means for connecting to the first PCI connector means of the computer motherboard means;
PCI bridge means for connecting to the second PCI connector means; and
a plurality of third PCI connector means connected to the PCI bridge means;
a printer controller board means comprising:
fourth PCI connector means; and
first local bus means for connecting to the fourth PCI connector means.

14. The printer control system according to claim 9, wherein the fourth PCI connector means of the printer controller board is connected to a first of the plurality of third PCI connector means of the extender board means, and further comprising a peripheral element controller board means comprising a second local bus means and a fifth PCI connector means to be connected to one of the plurality of third PCI connector means of the extender board means.

15. The printer control system according to claim 13, further comprising a peripheral element controller board means comprising:
a fifth PCI connector means for connecting to a first of the plurality of third PCI connector means of the extender board means;
a second local bus means; and
a sixth PCI connector means for connecting to the second local bus means;
wherein the fourth PCI connector means of the printer controller board means is connected to the sixth PCI connector means of the peripheral element controller board means.

16. The printer control system according to claim 14, wherein the peripheral element controller board means is a scanner controller board.

17. The printer control system according to claim 15, wherein the peripheral element controller board means is a scanner controller board.

18. The printer control system according to claim 13, further comprising bypass means for directly connecting a printer means connected to the printer controller board means to a scanner means.

* * * * *